DETECTION OF REMOTE PHASE MODULATION OF VARIABLE FREQUENCY CARRIER
Filed May 13, 1964
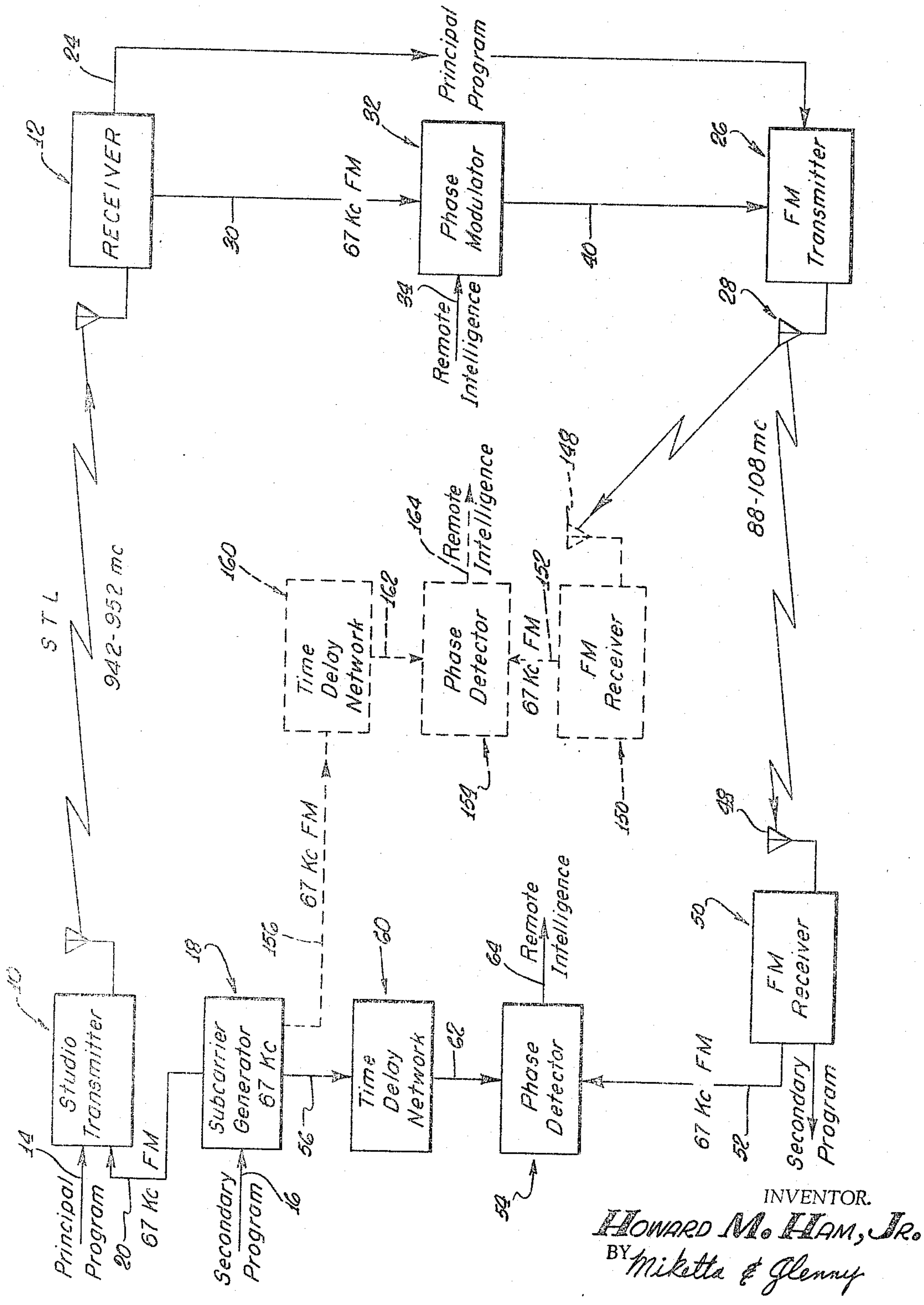
INVENTOR.
HOWARD M. HAM, JR.
BY Miketta & Glenny
ATTORNEYS.

United States Patent Office 3,317,838
Patented May 2, 1967

3,317,838
DETECTION OF REMOTE PHASE MODULATION OF VARIABLE FREQUENCY CARRIER

Howard M. Ham, Jr., Goleta, Calif., assignor to Moseley Associates, Inc., Santa Barbara, Calif., a corporation of California Filed May 13, 1964, Ser. No. 367,053
8 Claims. (Cl. 325—31)

This invention relates generally to transmission and reception of electrical signals carrying intelligence and specifically to circuitry for correction for the effect of transit times in a system where a signal of variable frequency such as a frequency modulated carrier or subcarrier, generated at a local station, is transmitted to a remote station, is there phase modulated by intelligence originating at the remote station, and as thus phase modulated is then transmitted to one or more receiving stations, which may include the local station, for detection of the remotely originating intelligence.

A preferred form of the invention will be illustrated and described in detail in connection with a conventional FM broadcasting system in which the transmitter site is remote from the studio and is linked thereto by a microwave Studio-Transmitter Link ("STL") on one of 19 channels in the 942–952 megacycle band provided for the purpose in accordance with present F.C.C. regulations. A typical installation provides for the broadcasting of two separate programs which may for convenience be referred to here as (1) a principal program and (2) a secondary program. The characteristics of the principal program have no direct bearing on the present invention; such principal program may be monaural, or it may be a multiplexed stereo signal of the type shown, for example, in the Csicsatka Patent 3,122,610; it may also include signals for remote control of transmitter operation, such as tone signals outside the audible range, say above 20 kc.

The secondary program above referred to corresponds to the "commercial" program mentioned in Patent 3,122,610, and includes the familiar background music or the like furnished on a lease basis to restaurants and similar outlets. It is the signal for this program which is modified by the circuitry and system of the present invention, in order to provide at receiving stations distant from the transmitter, including if desired at the studio, or local station, intelligence originating at the transmitter. It may be noted that in accordance with the invention, the secondary program itself typically originates at the local station, as by a tape or record player or equivalent program source.

In installations of the type contemplated, it is highly desirable, and in some instances required by regulatory agencies, that the local station monitor certain characteristics of the transmitter and its associated apparatus and environment. Such characteristics include, for example, transmitter power output, plate voltage, plate current, temperatures, input line voltage, condition of standby generator and the like. A convenient and economical means for accomplishing this telemetering is by phase modulation, at the remote station, of the subcarrier which carries the secondary program; and by subsequent detection, by phase detecting means at the studio, of the telemetered information and recording or use thereof in any desired way, such as by display on a conventional voltmeter.

Such phase detection may be accomplished by a phase comparator or discriminator, comparing the phase of the subcarrier signal received off the air with the phase of the original subcarrier signal of variable frequency.

For this to be done, it is necessary that the two signals being compared be in phase lock. It is a principal object of this invention to provide a novel system including time delay circuitry by which to prevent the loss of phase lock when comparing the phase difference between two similar signals of variable frequency, one signal having been phase modulated after a first transit time and the phase modulation being detected after a second transit time.

A typical subcarrier frequency is 67 kc. If this frequency remained constant, then phase detection at the studio of the phase modulation of one or more telemetered signals originating at the remote station would present no problem: conventional trimming of circuit components would suffice to compensate for phase shift around the entire loop, including the effect of transit time. However, when the frequency of the subcarrier is varied, as by being frequency modulated by the secondary program signal previously mentioned, it is found that the phase comparator will not remain in phase lock, unless compensation is made for the effect of transit time. Any conventional time delay means may be employed, so long as it is not frequency sensitive within the range of variation of the variable frequency signal, or subcarrier in the present illustrative embodiment of the invention.

The drawing shows, in block diagram form, an illustrative embodiment of a system in accordance with a preferred form of the present invention. The blocks which are shown in solid outline indicate the components in a typical installation where the phase modulated remote intelligence is to be detected at the studio site. In addition, as will be described in detail hereinafter, the figure shows in blocks of dotted outline other components by which such remote intelligence can be detected at a location other than at the studio and distant from the transmitter.

Thus a transmitter indicated generally at 10 is located at the studio or local station, and is linked with a receiver indicated at 12 located at a remote transmitting site, transmitter 10 and receiver 12 being linked as shown by an STL at a selected frequency in a frequency band prescribed by government regulations. It will be understood that the transmitter 10 and receiver 12 might be linked by other means such as a telephone line or the like having suitable transmission characteristics capable of transmitting the material without objectionable distortion or loss of strength.

To studio transmitter 10 are fed two programs. The principal program is fed at 14 to the transmitter, and a secondary program frequency modulates at 16 a subcarrier generator indicated generally at 18, the modulated output of generator 18 being fed to studio transmitter at 20. For clarity of understanding the subcarrier generator 18 is assumed to generate a frequency of 67 kc., and such carrier as frequency modulated by the secondary program is indicated in the drawing by "67 kc. FM."

At the transmitter site, the transmission received by receiver 12 is separated by conventional filter circuitry (not shown) so that the principal program is fed from the receiver through line 24 to the main FM transmitter indicated generally at 26, and by the latter is broadcast through antenna system indicated generally at 28 on an assigned frequency within the range, in accordance with present regulations, of 88–108 mc., as indicated in the drawing. In addition, the receiver 12 at the transmitter site feeds the frequency modulated subcarrier through line 30 to a phase modulator indicated generally at 32. Remote intelligence, which may include characteristics of the transmitter or other information desired, is fed through line 34 to phase modulator 32 and there phase modulates the 67 kc. FM signal passing therethrough. The output signal of the phase modulator, constituting the frequency modulated subcarrier as now phase modulated by the remote intelligence, is fed through line 40 to the main FM transmitter 26 and is broadcast as a subcarrier in conventional manner as part of the signal transmitted by the transmitter.

The signal transmitted by the main transmitter 26 is received by antenna 48 of a conventional FM receiver indicated generally at 50, located at the studio site, or local station. From receiver 50 the phase modulated 67 kc. FM signal is fed through line 52 to a phase detector indicated generally at 54, being a phase discriminator or comparator of conventional and well-known design. Subcarrier generator 18 feeds its 67 kc. FM output signal not only to studio transmitter 20 as above described, but also through line 56 to a time delay network indicated generally at 60 in accordance with the present invention. The output signal of time delay network 60 is fed through line 62 to phase detector 54, where the difference in phase between the two signals fed thereto is detected, and the remote intelligence originating at the transmitter site or remote station is produced in output line 64. It will be understood that such intelligence may be recorded, displayed or otherwise used in any desired way, such details forming no part of the present invention.

The time delay network 60 may be of any type which is not frequency sensitive within the range of the frequency variations of the signal passing therethrough. Thus, in a typical system in accordance with the invention, the frequency variations of the signal passing through the network 60 may be of the order of six kilocycles either way from 67 kc., and it is important in accordance with the invention that signals of all frequencies within that range be delayed by the same time period. Network 60 accordingly may employ magnetostrictive means, ultrasonic means or any suitable lumped constants circuit. In any case, the delay created by network 60 is designed in accordance with known principles to produce a delay in the signal passing therethrough equal to the transit time of the signal transmitted on the STL, plus the transit time of the signal broadcast by main transmitter 26 and received by receiver 50. Thus the output signal of network 60 constitutes a reference signal with which the signal in line 52 from receiver 50 is compared.

It is contemplated in accordance with the present invention that the phase modulating remote intelligence originating at the transmitter site may be detected at a receiving station distant from the transmitter site, other than the studio, where information is available as to phase of the 67 kc. FM signal from generator 18, and the transit times are known. Such an arrangement includes the broken line components and circuitry in the drawing, identified by reference numbers one hundred greater than their counterparts already described in connection with phase detection at the studio site.

Thus an FM receiver distant from both the studio and transmitter site is indicated generally at 150 and receives the signal transmitted by transmitter 26 through antenna 148. From receiver 150, the phase modulated 67 kc. FM signal is fed through line 152 to a phase detector indicated generally at 154 and constitutes one of the two input signals to be phase compared by the detector. From subcarrier generator 18 through line 156, there is fed the 67 kc. FM signal to a time delay network indicated generally at 160, and from the latter network through line 162; the delayed signal, constituting the reference signal, is fed to phase detector 154. In detector 154 the phase difference between the two signals fed thereto is detected, and the remote intelligence embodied in such difference is produced in the output line 164, in the same manner as previously described in connection with the components at the studio site. It will of course be understood that the time delay introduced by network 160 is that of the transit time of the STL plus the transit time from transmitter 26 to receiver 150, minus the transit time from the local station 10 to receiver 150.

Accordingly it will be seen that there is provided in accordance with the invention a system for detection of phase modulation of a variable frequency signal where transit times intervene between generation of the variable frequency signal, phase modulation thereof, and phase detection. It is of course recognized that phase modulation creates a frequency deviation which itself constitutes effective frequency modulation as seen by a frequency modulation discriminator, and care must hence be taken in a given system to prevent such effective frequency modulation from exceeding some maximum permissible value established by the requirements of the purity of the secondary program signal. In general, the effective frequency modulation so resulting from phase modulation is a function of both the frequency and the strength of the phase modulation. Accordingly it is desirable that the phase modulation occur at a low frequency, preferably at frequencies below the audible range, and these are satisfactory for telemetering purposes. Remote intelligence requiring even greater bandwidth can be transmitted and detected in accordance with the invention so long as the effective frequency modulation resulting therefrom does not produce a signal in the secondary program above the minimum discernible signal in that system. Conversely, when desired, the remote intelligence can be combined with the content of the secondary program by increasing the frequency and strength of remote phase modulation beyond the limits just suggested.

I claim:

1. A system for detection of remote phase modulation of a carrier of variable frequency comprising:

means at a local station for generating a first carrier of variable frequency and for transmitting said carrier to a remote station;

means at a remote station for receiving said carrier;

means at the remote station for phase modulating said first carrier in accordance with intelligence;

a transmitter at the remote station for generating and broadcasting a second carrier modulated by said phase modulated first carrier as a subcarrier;

a receiving station distant from the remote station for receiving said second carrier as so modulated;

time delay means for receiving as an input signal said first carrier as generated at the local station and for producing an output signal corresponding to said input signal but delayed therebehind by a time equal to the transit times from the local station to the remote station and thence to the receiving station minus the transit time from the local station to the receiving station;

and means at the receiving station for measuring the phase difference between said output signal and said received subcarrier and producing a signal carrying said intelligence.

2. The invention as stated in claim 1 wherein said receiving station is located at the local station.

3. The invention as stated in claim 1 wherein the variable frequency modulation of the first carrier comprises an audio program and the frequency of the phase modulating intelligence is below the audible range.

4. The invention as stated in claim 1 wherein said local station transmitting means includes a third carrier modulated by said first carrier as a subcarrier.

5. In a system for phase detection at a receiving station of intelligence phase modulating, at a station remote from a local station, a first carrier of variable frequency generated at the local station and transmitted by transmitting means to the remote station, the remote station including a transmitter for generating and broadcasting a second carrier modulated by said phase modulated first carrier as a subcarrier, and the receiving station including means for receiving said subcarrier and a phase detector for measuring the phase difference between the received subcarrier and a reference signal hereinafter defined, the provision of time delay means for receiving as an input signal said first carrier as generated at the local station and for producing therefrom an output signal constituting said reference signal and corresponding to said input signal but delayed therebehind by a time equal to the transit times from the local station to the remote station and thence to the receiving station minus the transit time from the local station to the receiving station.

6. The invention as stated in claim 5 wherein said receiving station is located at the local station.

7. The invention as stated in claim 5 wherein the variable frequency modulation of the first carrier comprises an audio program and the frequency of the phase modulating intelligence is below the audible range.

8. The invention as stated in claim 5 wherein said transmitting means includes a third carrier modulated by said first carrier as a subcarrier.

References Cited by the Examiner

UNITED STATES PATENTS

| | | | |
|---|---|---|---|
| 1,750,668 | 3/1930 | Green | 325—29 X |
| 1,901,642 | 3/1933 | Hansell | 325—48 |
| 3,028,488 | 4/1962 | Hudspeth et al. | 325—7 |
| 3,230,453 | 1/1966 | Boor et al. | 325—67 |

DAVID G. REDINBAUGH, *Primary Examiner.*

B. V. SAFOUREK, *Assistant Examiner.*